United States Patent
Park

(10) Patent No.: US 8,863,725 B2
(45) Date of Patent: Oct. 21, 2014

(54) APPARATUS FOR REDUCING PUMPING LOSS AND ENGINE INCLUDING THE SAME

(71) Applicant: Hyundai Motor Company, Seoul (KR)

(72) Inventor: Sung Yup Park, Siheung-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/711,422

(22) Filed: Dec. 11, 2012

(65) Prior Publication Data

US 2014/0076276 A1 Mar. 20, 2014

(30) Foreign Application Priority Data

Sep. 19, 2012 (KR) .................. 10-2012-0104197

(51) Int. Cl.
| | | |
|---|---|---|
| *F02B 33/44* | (2006.01) | |
| *F02B 33/06* | (2006.01) | |
| *F02B 67/08* | (2006.01) | |
| *F02B 39/08* | (2006.01) | |

(52) U.S. Cl.
CPC .................. *F02B 33/44* (2013.01); *F02B 33/06* (2013.01); *F02B 67/08* (2013.01); *F02B 39/08* (2013.01)
USPC .................. 123/316; 123/184.51; 123/184.53; 123/58.7

(58) Field of Classification Search
USPC ............. 123/184.47, 184.51, 184.53, 184.57, 123/316, 58.7; 60/605.1
See application file for complete search history.

(56) References Cited

U.S. PATENT DOCUMENTS

| | | | | |
|---|---|---|---|---|
| 3,980,060 | A | * | 9/1976 | Noguchi et al. .............. 123/261 |
| 4,211,082 | A | * | 7/1980 | Bristol .......... 60/605.1 |
| 4,773,358 | A | * | 9/1988 | Heath ...................... 123/51 AA |
| 4,986,225 | A | * | 1/1991 | Wu et al. .................. 123/184.54 |
| 5,540,055 | A | * | 7/1996 | Kee ............................. 60/605.1 |
| 6,167,857 | B1 | * | 1/2001 | McCord .................. 123/184.53 |
| 6,302,076 | B1 | * | 10/2001 | Bredy ...................... 123/184.21 |
| 6,647,956 | B1 | * | 11/2003 | Sharpton .................. 123/339.1 |
| 6,886,517 | B2 | * | 5/2005 | Linhart et al. ........... 123/184.53 |
| 7,281,512 | B2 | * | 10/2007 | Marentette .............. 123/184.54 |

FOREIGN PATENT DOCUMENTS

| | | | | | |
|---|---|---|---|---|---|
| JP | 57016224 | A | * | 1/1982 | ............. F02B 27/00 |
| JP | 02264132 | A | * | 10/1990 | ............. F02D 33/00 |
| KR | 1992-0021845 | A | | 12/1992 | |
| KR | 1998-054187 | A | | 9/1998 | |

OTHER PUBLICATIONS

JP57016224A, Sakaoka et al., translation, pp. 1-7.*

* cited by examiner

*Primary Examiner* — Lindsay Low
*Assistant Examiner* — Grant Moubry
(74) *Attorney, Agent, or Firm* — Morgan, Lewis & Bockius LLP

(57) ABSTRACT

An apparatus for reducing a pumping loss may include an auxiliary runner formed in an air-intake unit supplying air to a cylinder, wherein intake air may be temporarily stored in the auxiliary runner by using a flow of an exhaust gas during an exhaust stroke, and the intake air stored in the auxiliary runner may be supplied to the cylinder together with the air introduced to the air-intake unit during an intake stroke.

5 Claims, 3 Drawing Sheets

APPARATUS FOR REDUCING PUMPING LOSS AND ENGINE INCLUDING THE SAME

CROSS-REFERENCE TO RELATED APPLICATION

The present application claims priority to Korean Patent Application No. 10-2012-0104197 filed on Sep. 19, 2012, the entire contents of which is incorporated herein for all purposes by this reference.

BACKGROUND OF THE INVENTION

1. Field of the Invention

The present invention relates an apparatus for reducing a pumping loss and an engine including the same, and more particularly, to an apparatus for reducing a pumping loss made between intake strokes, and an engine including the same.

2. Description of Related Art

An internal combustion engine, in particular, a 4-cycle engine, obtains driving force through intake, compression, expansion or power, and exhaust strokes in each cylinder.

However, an idle interval during which an air-take valve is closed between intake strokes is generated in each cylinder to make a pumping loss and degrade performance.

In particular, such a phenomenon is problematic in case of a single-cylinder engine or a two-cylinder engine in which pistons reciprocate simultaneously.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for reducing a pumping loss having advantages of reducing a pumping loss made between intake strokes, an engine including the same, and a vehicle including the same.

In an aspect of the present invention, an apparatus for reducing a pumping loss may include an auxiliary runner formed in an air-intake unit supplying air to a cylinder, wherein intake air is temporarily stored in the auxiliary runner by using a flow of an exhaust gas during an exhaust stroke, and the intake air stored in the auxiliary runner is supplied to the cylinder together with the air introduced to the air-intake unit during an intake stroke.

The apparatus for reducing the pumping loss may further include a venturi tube fluid-connecting the auxiliary runner to an expel unit expelling the exhaust gas outside of the cylinder.

The apparatus for reducing the pumping loss may further include an auxiliary piston slidably provided in the auxiliary runner, and an elastic member disposed in the auxiliary runner and elastically supporting the auxiliary piston, wherein the intake air is temporarily stored in the auxiliary runner by moving the auxiliary piston overcoming an elastic force of the elastic member by using negative pressure applied in the venturi tube.

The apparatus for reducing the pumping loss may further include an auxiliary piston slidably provided in the auxiliary runner, and an elastic member elastically supporting the auxiliary piston, wherein the intake air is temporarily stored in the auxiliary runner by moving the auxiliary piston overcoming an elastic force of the elastic member by using negative pressure of an expel unit that expels the exhaust gas of the cylinder.

An engine may include the apparatus for reducing the pumping loss.

The engine is a two-cylinder engine in which respective cylinders simultaneously reciprocate in the same direction, respectively.

The engine is a single-cylinder engine.

In the case of the apparatus for reducing a pumping loss, an engine including the same, and a vehicle including the same according to embodiments of the present, a pumping loss made between intake strokes is reduced, and thus, fuel efficiency can be increased.

In addition, since exhaust efficiency is improved, fuel efficiency can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
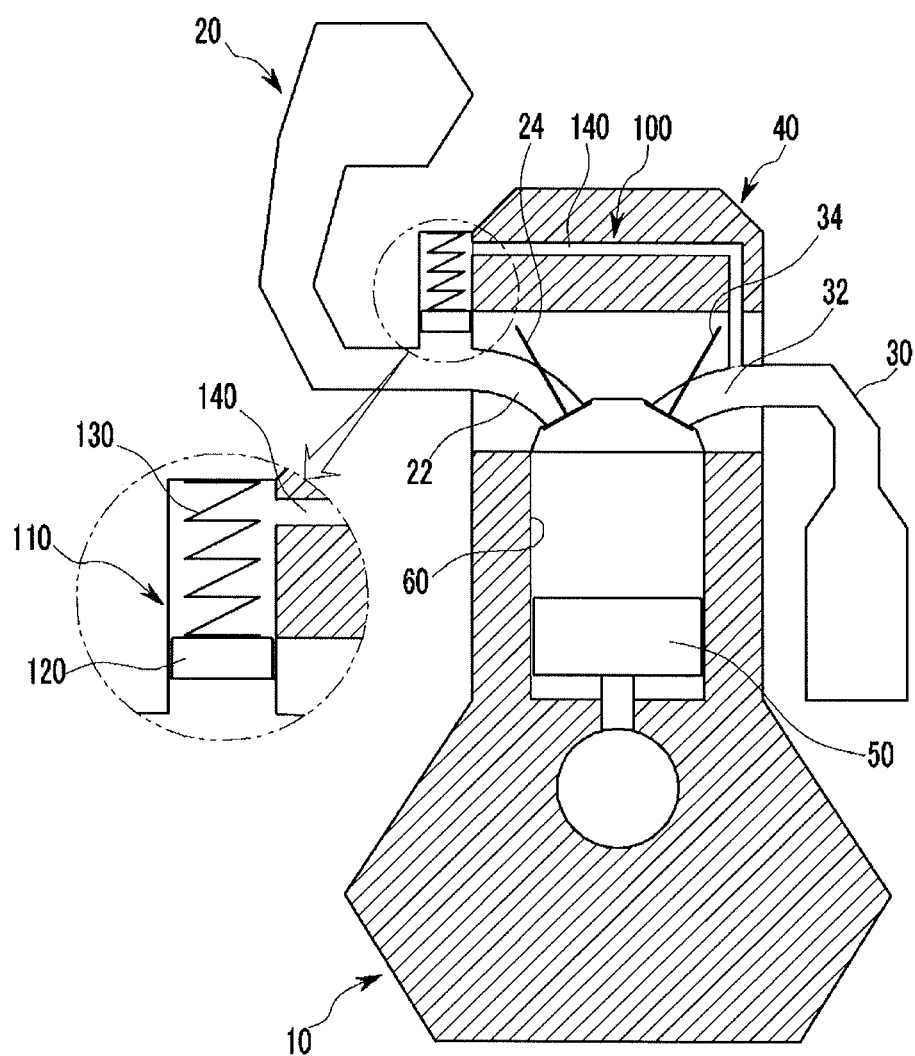
FIG. 1 is a view illustrating an engine including an apparatus for reducing a pumping loss according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Throughout the specification, components denoted by the same reference numerals are the same components.

In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Throughout the specification, unless explicitly described to the contrary, the word "include" and variations such as "includes" or "including", will be understood to imply the inclusion of stated elements but not the exclusion of any other elements.

An exemplary embodiment of the present invention will hereinafter be described in detail with reference to the accompanying drawings.

FIG. 1 is a view illustrating an engine including an apparatus for reducing a pumping loss (or a pumping loss reducing apparatus) according to an exemplary embodiment of the present invention.

Referring to FIG. 1, an engine 10 according to an exemplary embodiment of the present invention includes an intake manifold 20 to which fresh air is introduced, an intake port 22 guiding fresh air of the intake manifold 20 to a cylinder 60 of the engine 10, and an intake valve 24 provided in the intake port 22 and opened and closed to control introduction of fresh air to the cylinder 60.

Further, the engine 10 includes an exhaust manifold 30 expelling exhaust gas from the cylinder 60, an exhaust port 32 allowing the cylinder 60 and the exhaust manifold 30 to communicate with each other, and an exhaust valve 34 provided in the exhaust port 32 to control expulsion of exhaust gas from the cylinder 60.

A piston 50 is provided in the cylinder 60 and reciprocates in the cylinder 60 according to combustion of introduced fuel.

A head cover 40 is provided in an upper portion of the engine 10.

The engine 10 includes a diesel engine, a general gasoline engine, or a gasoline direct injection (GDI) engine, and may also include an injector, a spark plug, and the like.

In describing the pumping loss reducing apparatus and the engine according to an exemplary embodiment of the present invention, the intake manifold 20 and/or the intake port 22 will be referred to as an intake unit.

Also, in describing the pumping loss reducing apparatus and the engine according to an exemplary embodiment of the present invention, the exhaust manifold 30 and/or the exhaust port 32 will be referred to as an expelling unit.

The pumping loss reducing apparatus 100 according to an exemplary embodiment of the present invention includes an auxiliary runner 110 formed in the intake unit 20 or 30 supplying air to the cylinder 60.

In the drawing, it is illustrated that the auxiliary runner 110 is formed in the intake port 22, but the present invention is not limited thereto and the auxiliary runner 110 may be formed in the intake manifold 20.

During an exhaust stroke of the engine 10, the pumping loss reducing apparatus 100 may temporarily store intake air in the auxiliary runner 110 by using a flow of exhaust gas, and during a intake stroke, the pumping loss reducing apparatus 100 may supply air stored in the auxiliary runner 110 together with air introduced to the intake unit 20 or 30 to the cylinder 60.

The pumping loss reducing apparatus 100 may further include a venturi tube 140 allowing the expelling unit 30 or 32 that expels exhaust gas of the cylinder 60 and the auxiliary runner 110 to communicate with each other.

The pumping loss reducing apparatus 100 may further include an auxiliary piston 120 provided in the auxiliary runner 110 and a piston spring 130 elastically supporting the auxiliary piston 120 in the auxiliary runner 110, and temporarily store intake air in the auxiliary runner 110 by moving the auxiliary piston 120 by using negative pressure of the venturi tube 140.

In the drawing, it is illustrated that the venturi tube 140 is connected to the exhaust port 32, but the present invention is not limited thereto and the venturi tube 140 may be connected to the exhaust manifold 30.

Also, the pumping loss reducing apparatus 100 may further include the auxiliary piston 120 provided in the auxiliary runner 110 and the piston spring 130 elastically supporting the auxiliary piston 120 in the auxiliary runner 110, and temporarily store intake air in the auxiliary runner 110 by moving the auxiliary piston 120 by using negative pressure of the expelling unit 30 or 32 that expels exhaust gas of the cylinder 60.

Namely, in the drawing, it is illustrated that the venturi tube 140 is provided to allow the exhaust port 32 and the auxiliary runner 120 to communicate with each other to make exhaust gas of the exhaust port 32 flow therein, but the present invention is not limited thereto and various configurations may be implemented such that the auxiliary piston 120 is moved by using negative pressure formed in the exhaust port 32.

Also, it is illustrated that the venturi tube 140 is formed in the head cover 40, but the present invention is not limited thereto and the venturi tub 140 may also be formed in other portion of the engine 10.

Figure 2:
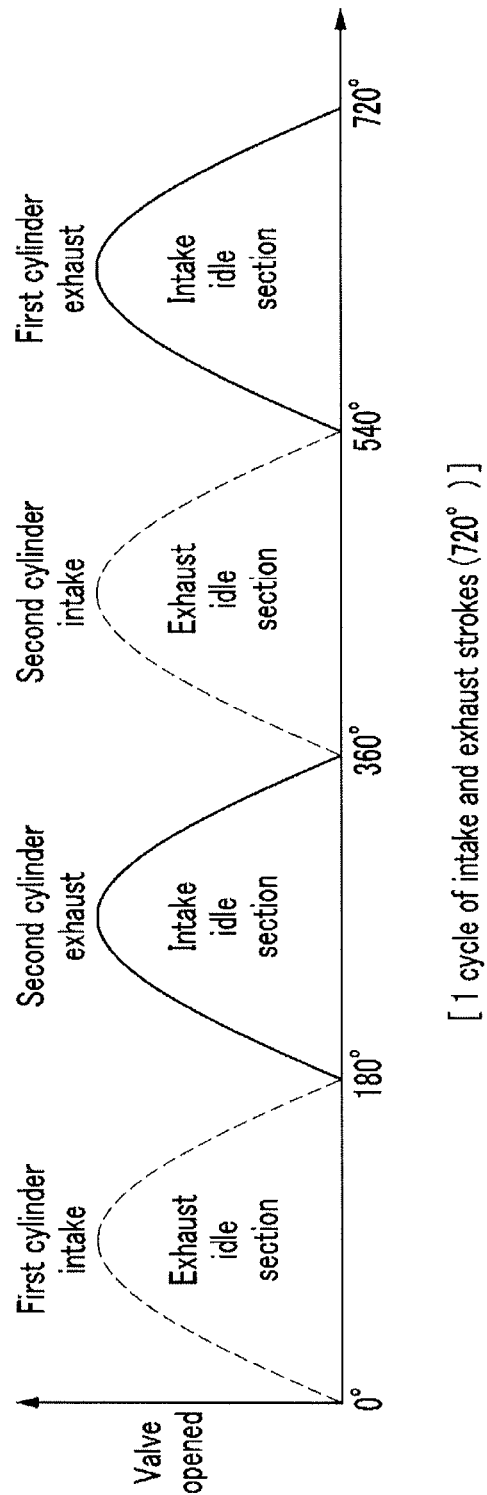
FIG. 2 is a graph showing a valve profile of a two-cylinder engine including the apparatus for reducing a pumping loss according to an exemplary embodiment of the present invention.
Figure 3:
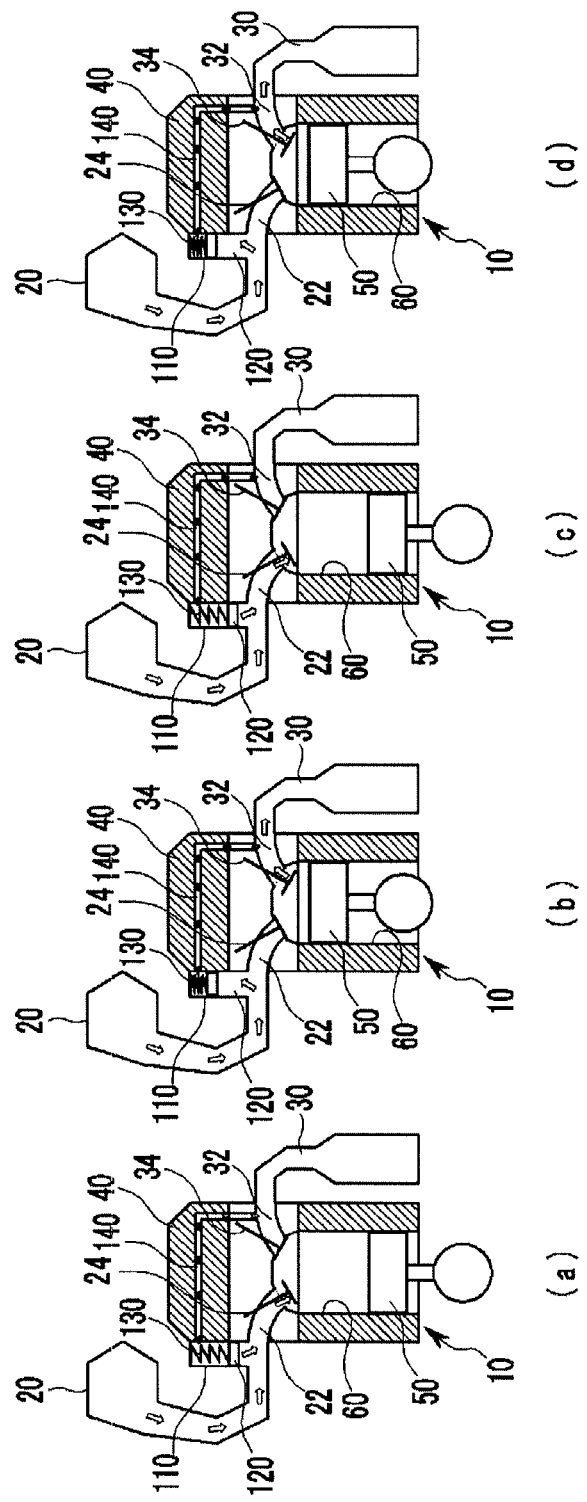
FIG. 3 is a view illustrating an operation of the two-cylinder engine including the apparatus for reducing a pumping loss according to an exemplary embodiment of the present invention.

FIG. 2 is a graph showing a valve profile of a two-cylinder engine including the apparatus for reducing a pumping loss according to an exemplary embodiment of the present invention. FIG. 3 is a view illustrating an operation of the two-cylinder engine including the pumping loss reducing apparatus 100 according to an exemplary embodiment of the present invention.

Hereinafter, a two-cylinder engine including the pumping loss reducing apparatus 100 according to an exemplary embodiment of the present invention will be largely described, but the pumping loss reducing apparatus according to an exemplary embodiment of the present invention may also be applicable to a single cylinder engine or multi-cylinder engine, as well as to the two-cylinder engine.

As illustrated in FIG. 2, in case of a two-cylinder engine, in particular, in case of a two-cylinder engine in which pistons simultaneously reciprocate in the same direction, a valve may be deactivated between intake strokes of the respective cylinders, potentially making a pumping loss and degrading performance.

As illustrated in FIG. 2 and (a) of FIG. 3, for example, on the assumption that one of the two-cylinder engine is a first cylinder and the other is a second cylinder, in a 0°~180° section of a crank shaft, namely, during a intake stroke of the first cylinder, the intake valve 24 of the first cylinder is opened and the exhaust valves 34 of the first cylinder and the second cylinder are closed, coming to an exhaust deactivation state. Of course, in this state, the intake valve 24 of the second cylinder is closed.

As illustrated in FIG. 2 and (b) of FIG. 3, in a 180°~360° section of the crank shaft, namely, during an exhaust stroke of the second cylinder, the exhaust valve 34 of the second cylinder is opened and the intake valves 24 of the first cylinder and the second cylinder are closed, coming to an intake deactivation state. Of course, in this state, the exhaust valve 34 of the first cylinder is closed.

As illustrated in FIG. 2 and (c) of FIG. 3, in a 360°~540° section of the crank shaft, namely, during a intake stroke of the second cylinder, the intake valve 24 of the second cylinder is opened and the exhaust valves 34 of the first cylinder and the second cylinder are closed, coming to an exhaust deactivation state. Of course, in this state, the intake valve 24 of the first cylinder is closed.

As illustrated in FIG. 2 and (d) of FIG. 3, in a 540°~720° section of the crank shaft, namely, during an exhaust stroke of the first cylinder, the exhaust valve 34 of the first cylinder is opened and the intake valves 24 of the first cylinder and the second cylinder are closed, coming to an intake deactivation state. Of course, in this state, the exhaust valve 34 of the first cylinder is closed.

Namely, as illustrated in FIG. 2 and (a) to (d) of FIG. 3, during one cycle (720°), a deactivation section is generated between the respective intake strokes, making a pumping loss and degrading engine performance.

Hereinafter, an operation or the two-cylinder engine including the pumping loss reducing apparatus according to an exemplary embodiment of the present invention will be described with reference to FIGS. 2 and 3.

Referring to (a) of FIG. 3, in the 0°~180° section of the crank shaft, namely, according to the intake stroke of the first cylinder, the intake valve 24 of the first cylinder is opened and the intake valve 24 of the second cylinder and the exhaust valves 34 of the first cylinder and the second cylinder are closed.

At this time, due to repulsive force of the piston spring 130, the auxiliary piston 120 is lowered, and thus, air temporarily stored in the auxiliary runner 110 is introduced together with fresh air, which flows to the intake manifold 20, to the cylinder 60. Thus, intake efficiency can be increased. Also, as the auxiliary piston 120 is lowered, exhaust gas of the exhaust port 32 is introduced to the auxiliary runner 110 through the venturi tube 140. Thus, pressure of the exhaust port 32 is lowered, so an exhaust stroke of the other cylinder (e.g., the second cylinder) is smoothed.

Referring to (b) of FIG. 3, in the 180°~360° section of the crank shaft, namely, according to the exhaust stroke of the second cylinder, the exhaust valve 34 of the second cylinder is opened and the exhaust valve 34 of the first cylinder and the intake valves 24 of the first cylinder and the second cylinder are closed.

At this time, an exhaust gas flows out from the exhaust port 32 and pressure thereof is lowered, and thus, the auxiliary piston 120 is lifted and air is temporarily stored in the auxiliary runner 110.

Referring to (c) of FIG. 3, in the 360°~540° section of the crank shaft, namely, according to the intake stroke of the second cylinder, the intake valve 24 of the second cylinder is opened and the intake valve 24 of the first cylinder and the exhaust valves 34 of the first cylinder and the second cylinder are closed.

At this time, due to repulsive force of the piston spring 130, the auxiliary piston 120 is lowered, and thus, air temporarily stored in the auxiliary runner 110 is introduced together with fresh air, which flows to the intake manifold 20, to the cylinder 60. Thus, intake efficiency can be increased. Also, as the auxiliary piston 120 is lowered, exhaust gas of the exhaust port 32 is introduced to the auxiliary runner 110 through the venturi tube 140. Thus, pressure of the exhaust port 32 is lowered, so an exhaust stroke of the other cylinder (e.g., the first cylinder) is smoothed.

Referring to (d) of FIG. 3, in the 540°~720° section of the crank shaft, namely, according to the exhaust stroke of the first cylinder, the exhaust valve 34 of the first cylinder is opened and the exhaust valve 34 of the second cylinder and the intake valves 24 of the first cylinder and the second cylinder are closed.

At this time, an exhaust gas flows out from the exhaust port 32 and pressure thereof is lowered, and thus, the auxiliary piston 120 is lifted and air is temporarily stored in the auxiliary runner 110. Thereafter, the process of (a) to (d) of FIG. 3 is repeatedly performed.

As described above, in the case of the pumping loss reducing apparatus and the engine including the same according to embodiments of the present invention, a pump loss made between the intake strokes can be reduced to increase fuel efficiency, and in addition, exhaust efficiency can be enhanced to improve fuel efficiency.

The engine according to an exemplary embodiment of the present invention may include the foregoing pumping loss reducing apparatus. In particular, as illustrated in FIGS. 2 and 3, the engine according to an exemplary embodiment of the present invention may be two-cylinder engine in which respective cylinders simultaneously reciprocate in the same direction.

Also, the engine according to an exemplary embodiment of the present invention may be single cylinder engine including one cylinder. Namely, in case of a general single cylinder engine, deactivation of a value exists between the intake strokes of the respective cylinders like the two-cylinder engine, potentially making a pumping loss and degrading performance. However, when the pumping loss reducing apparatus 100 according to an exemplary embodiment of the present invention is provided, similar to the cases illustrated in FIGS. 2 and 3, a pumping loss made between intake strokes can be reduced, and thus, fuel efficiency can be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing a pumping loss, the apparatus comprising:
   an auxiliary runner formed in an air-intake unit supplying air to a cylinder of an engine;
   wherein the auxiliary runner is connected between an intake port and an exhaust port of the cylinder;
   wherein intake air is temporarily stored in the auxiliary runner by a negative pressure incurred from a flow of an exhaust gas in the exhaust port of the cylinder during an exhaust stroke, and the intake air stored in the auxiliary runner is supplied to the cylinder together with the air introduced to the air-intake unit during an intake stroke;

wherein the engine is a two-cylinder engine in which a piston of respective cylinders simultaneously reciprocates in a same direction, respectively.

2. The apparatus for reducing the pumping loss of claim 1, further including:

a venturi tube fluid-connecting the auxiliary runner to an expel unit expelling the exhaust gas outside of the cylinder.

3. The apparatus for reducing the pumping loss of claim 2, further including:

an auxiliary piston slidably provided in the auxiliary runner; and an elastic member disposed in the auxiliary runner and elastically supporting the auxiliary piston, wherein the intake air is temporarily stored in the auxiliary runner by moving the auxiliary piston overcoming an elastic force of the elastic member by using negative pressure applied in the venturi tube.

4. The apparatus for reducing the pumping loss of claim 1, further including:

an auxiliary piston slidably provided in the auxiliary runner; and an elastic member elastically supporting the auxiliary piston, wherein the intake air is temporarily stored in the auxiliary runner by moving the auxiliary piston overcoming an elastic force of the elastic member by using negative pressure of an expel unit that expels the exhaust gas of the cylinder.

5. An engine including the apparatus for reducing the pumping loss according to claim 1.

* * * * *